Feb. 9, 1932.　　　M. J. ANDERSON　　　1,844,627
CONVEYING APPARATUS
Original Filed April 9, 1927　　3 Sheets-Sheet 1
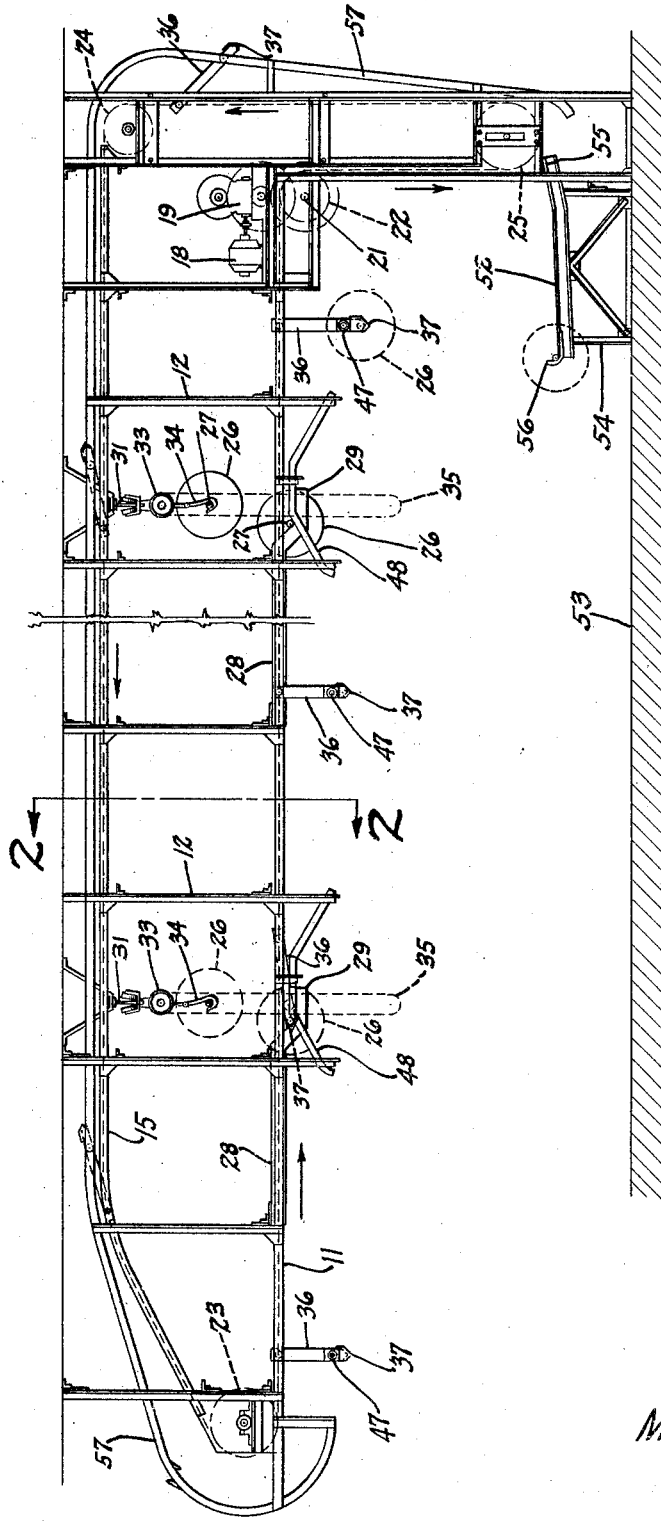
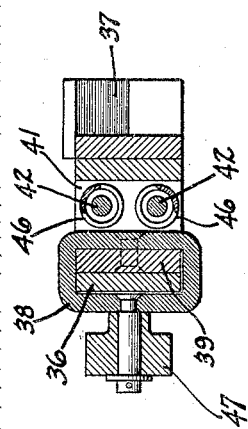
Inventor
MARTIN J. ANDERSON
By Paul Paul Nelson
ATTORNEYS

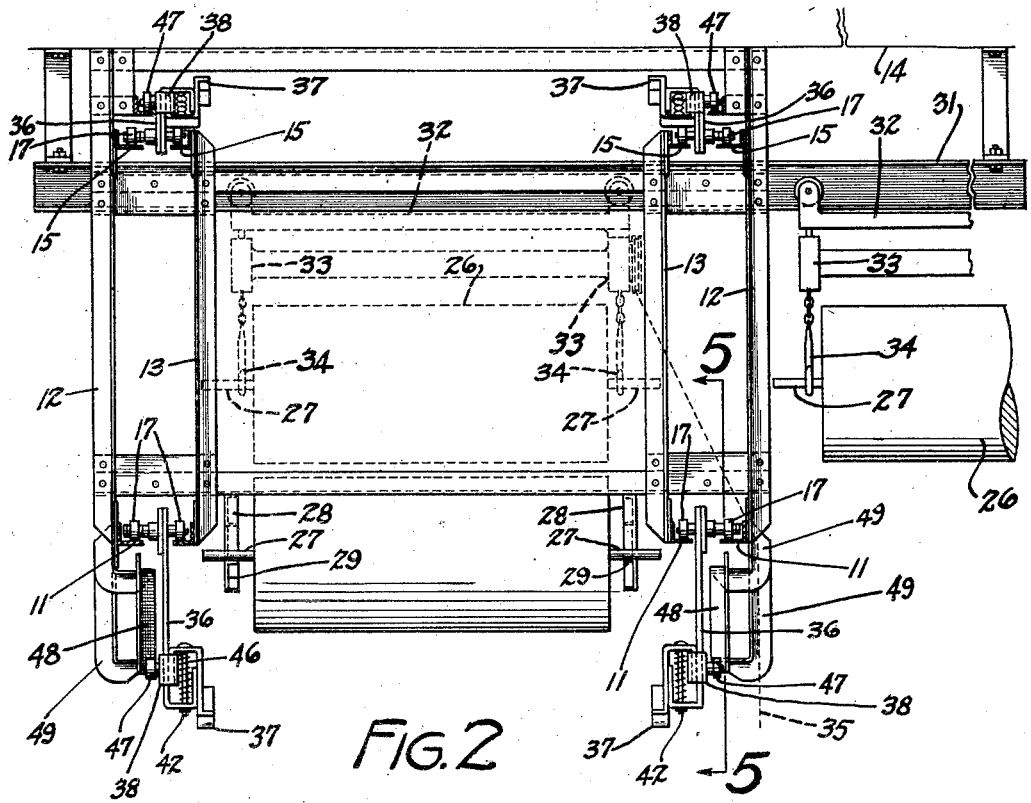
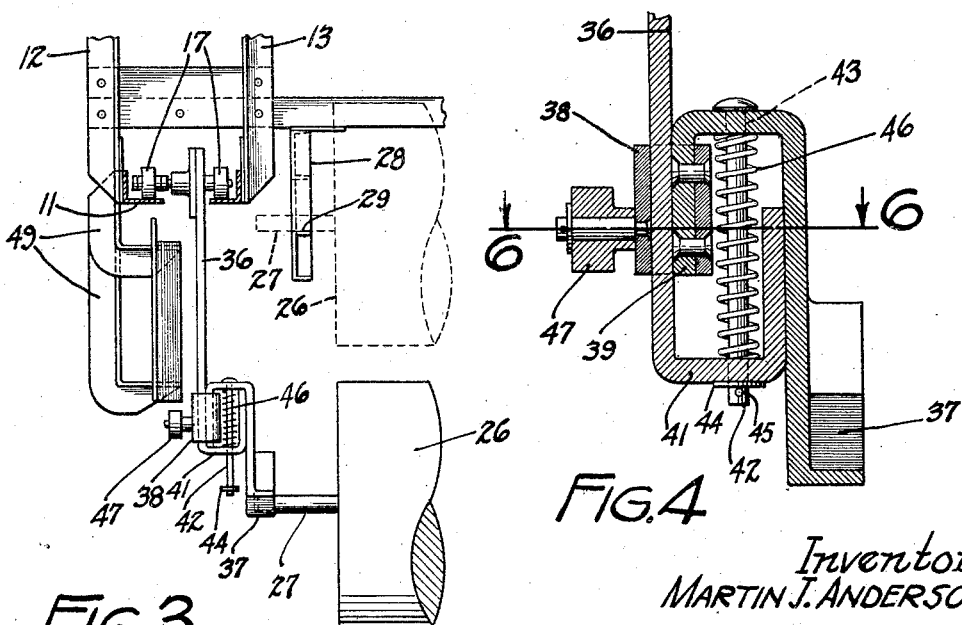

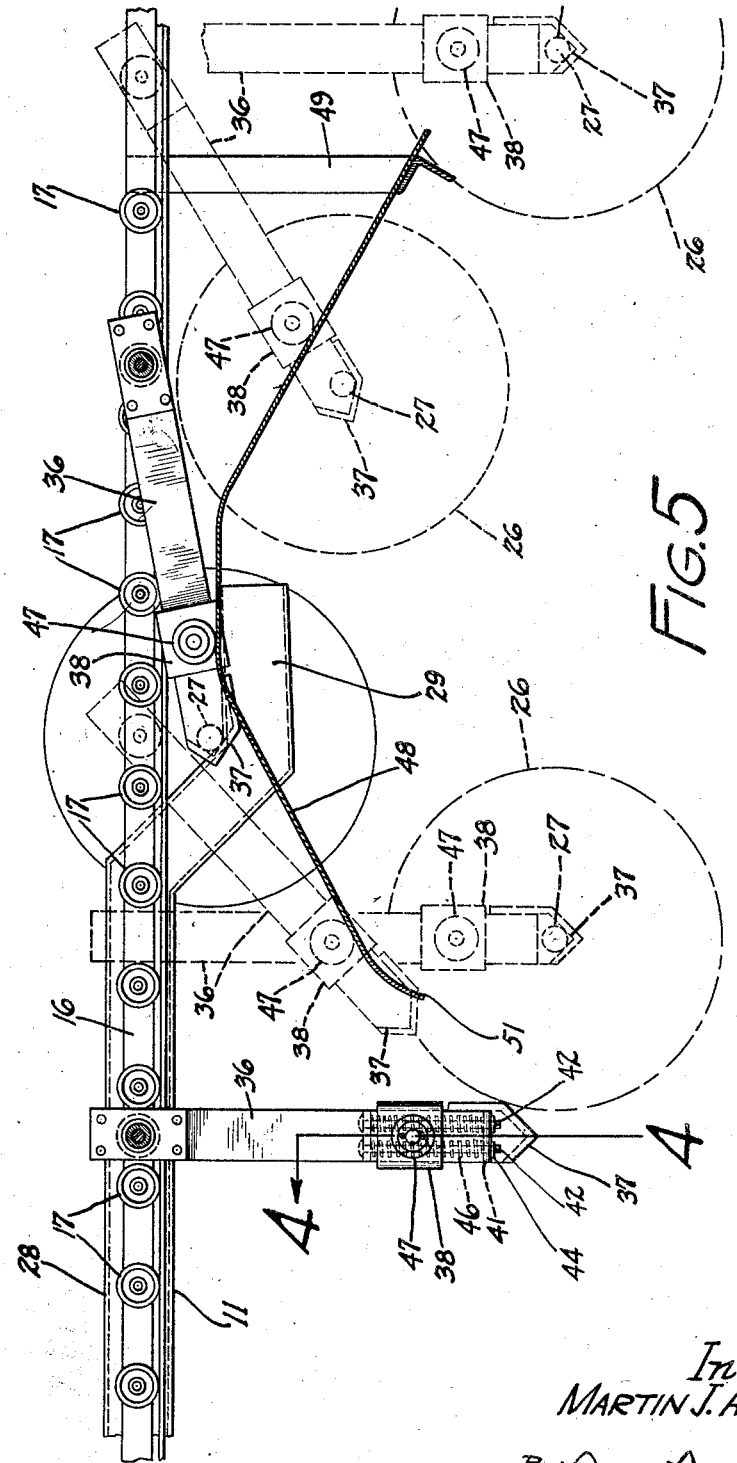

Patented Feb. 9, 1932

1,844,627

UNITED STATES PATENT OFFICE

MARTIN J. ANDERSON, OF ELLWOOD CITY, PENNSYLVANIA, ASSIGNOR TO MATHEWS CONVEYER COMPANY, OF ELLWOOD CITY, PENNSYLVANIA, A CORPORATION OF PENNSYLVANIA

CONVEYING APPARATUS

Application filed April 9, 1927, Serial No. 182,511. Renewed September 17, 1930.

This invention relates to improvements in conveying apparatus and more particularly to such apparatus of the over-head type comprising a plurality of pendently supported article-carrying members.

An object of the present invention is to provide a conveying apparatus comprising an elevated conveyer belt having one or more article-carriers or holders pivotally connected therewith and normally depending therefrom, and the connection of each holder with the conveyer chain or belt being such that when the holder is loaded, it will be depressed or moved downwardly with respect to the conveyer belt and, when unloaded, it will be held in an elevated position in such a manner that it will engage a cam arranged beneath the conveyer belt and will be elevated to a still higher level to clear obstacles therebeneath, after which it will again be lowered to its normal suspended position beneath the conveyer belt.

A further object of the invention is to provide a conveying apparatus comprising horizontally spaced rails or tracks adapted to support conveyer belts or chains, having one or more depending arms pivotally connected therewith and arranged in pairs, and the lower ends of each arm being provided with a carrier or holder slidably connected therewith and adapted to support an article, such as a shaft or a loom beam, and which holders are adapted to automatically pick up such articles from elevated stations along the conveyer, and, after being loaded, they will pass uninterruptedly onward to an unloading station where the article is automatically unloaded therefrom, after which the empty holders may continue onward to pick up another load from a loading station.

A further object is to provide a conveyer system comprising a pair of conveyer chains supported upon tracks and each having carrying arms pivotally connected therewith and depending therefrom, which arms are provided with suitable hooks, trays, or baskets adapted to pick up and carry a load, and each arm further having means adapted to engage cams arranged beneath the track which function to elevate the holders from a normal suspended position to a loading station, arranged at a higher level and where the holders will automatically pick up a load, after which they will again be lowered to a suspended position beneath the conveyer chains, and the weight of the article upon the holders causing the latter to be moved downwardly to a position to allow them to pass uninterruptedly beneath other cams, until they reach a point in the conveyer system where the article will be automatically unloaded therefrom.

A further object is to provide means whereby the suspended article-carrying arms will be extended in length or elongated when a weight or load is attached thereto, and spring means being provided to normally retain the arms in their retracted positions as when empty, and the lower movable portion of each arm having a guide roller mounted thereon adapted successively to engage cams arranged beneath the conveyer chains; these cams being located in such a manner that when a load is carried by the suspended arms and the latter are extended or elongated, the guide rollers will pass beneath the cams without engaging therewith, thus permitting the loaded arms to continue onward over the conveyer system without interruption and, when empty, the guide rollers on said arms will engage said cams and automatically raise the lower ends of the arms to suitable heights or levels to provide clearance therebeneath, or for picking up a load from an elevated loading station, while the arms are in continuous movement.

The particular object of the invention therefore, is to provide an improved conveying apparatus of the class described.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification:

Figure 1 is a view in side elevation of the improved conveying apparatus;

Figure 2 is a cross sectional view on the line 2—2 of Figure 1, showing the article-carriers or holders in their normal suspended positions;

Figure 3 is an enlarged detailed sectional view showing one of the holders in depressed or extended position to permit the guide roller thereon to pass beneath the cam;

Figure 4 is an enlarged detailed sectional view on the line 4—4 of Figure 5, showing the general construction of the connection between holder and supporting arm;

Figure 5 is a detailed sectional view on the line 5—5 of Figure 2, showing one of the cam elements; and Figure 6 is a cross sectional view on the line 6—6 of Figure 4.

The novel conveying apparatus featured in this invention is shown in a general way in Figures 1 and 2 and comprises pairs of angle iron rails 11, each supported by suitable frames or hangers 12 and 13. The frames or members 12 have their upper ends suitably secured to a supporting means, such as the ceiling 14. Similar rails or tracks 15 are mounted adjacent the upper ends of the hangers 12 and 13. A pair of endless belts or chains 16, each having a plurality of anti-friction rollers 17 embodied in the construction thereof, are adapted to travel in a vertical plane over the rails 11 and 15 as shown in Figure 2.

A motor 18 provides means for operating the chains 16. This motor has a gear drive 19 connecting it with a shaft 21, having a sprocket 22 mounted at each end thereof and over which the chains pass, as shown in Figure 1. A sprocket 23 is provided at the left hand side of the frame as shown in Figure 1, to guide the chain from the upper track sections 15 onto the lower track sections 11, and similar sprockets 24 and 25 are provided at the opposite end of the conveying apparatus for guiding the chains in the manner shown.

The conveying apparatus featured in this invention is particularly adapted for use to handle loom beams, such as are used in textile mills, but it is, of course, applicable for many other uses such, for instance, as supporting or conveying a shaft, a bar, or other elongated devices. The loom beam shown in the drawings is of ordinary construction, and comprises a large spool or cylinder 26 mounted upon a shaft 27, the ends of which project outwardly at each end thereof, as shown in Figure 2. Such loom beams are comparatively heavy, and it is, therefore, desirable that means be provided for conveying or transporting them from one place in a mill to another, with the least amount of effort.

The conveying apparatus here shown is self-loading and self-unloading. A plurality of loading stations are arranged along the lower rails or tracks 11 and each consists of a suitably supported channel member or iron 28 having an off-set end portion 29, arranged beneath the tracks 11 and upon which the shaft ends 27 of the loom 26 are adapted to be positioned, as shown in Figures 1 and 5. An I-beam 31 is transversely arranged beneath the upper rails 15 and above each loading station as shown in Figure 1. These I-beams provide tracks upon which suitable carriages 32 are mounted, each carriage having a suitable block and chain device 33 provided with hooks 34, adapted to receive the shaft ends 27 of the loom 26. (See Figure 2). By means of the carriages 32 and the chain blocks 33, the loom may be picked up from the floor and elevated to the full line position shown at the right hand side of Figure 2, after which the carriage 32 may be moved to the dotted line position in this same figure and the chain blocks operated to lower the loom to the full line position shown in Figure 2. The shaft ends 27 of the loom will then be supported upon the off-set end portions 29 of the channel members 28. The chain blocks are operable by the usual endless operating chain 35, shown in Figure 1.

The means provided for picking up and conveying the articles from one place to another is best shown in Figures 3, 4 and 5, and consists of a plurality of arms 36 pivotally connected with the chains 16, as shown particularly in Figure 5. The arms of each chain are aligned or arranged in pairs, and as the chains are operated simultaneously, a pair of lifting arms will engage the shaft ends 27 of the loom as shown in the dotted lines in Figure 5. Each arm 36 is provided at its lower end with an article-carrier or holder 37, having a movable connection with the arm 36 by means of a sleeve member 38 arranged to encircle the lower portion of the arm 36 and a depending portion 39 of the holder 37. The sleeve 38 is secured to the end portion 39 by such means as riveting. The lower end portion 41 of each arm 36 is bent outwardly and upwardly to provide a guide for the holder 37 and also for one end of a spring guide rod 42 having its upper end seated in an aperture 43, provided in the upper horizontal portion of the holder 37. A washer 44 and pin 45 is provided in the lower end of each rod 42 to limit the upward movement of the holder with respect to the arm 36. A compression spring 46 is interposed between the lower horizontal portion 41 of the arm 36 and the upper horizontal portion of the holder 37, and normally retains the holder 37 in the raised position shown in Figure 4. A guide roller 47 is provided upon the sleeve 38 adapted to engage a cam element 48 mounted beneath the tracks 11 and supported by suitable hangers 49, as shown in Figures 2 and 3. In the drawings, I have shown two springs 46, for holding each holder in its normal raised position, but it is to be understood, of course, that one, if sufficiently strong, will function equally as well.

In the operation of this model conveying apparatus, the looms are positioned upon the off-set end portions 29 of the channel members 28, as shown in dotted lines at the left hand side of Figure 1 and in full lines at the right hand side of this figure. When the holders 37 are empty, as shown in Figure 5, the guide rollers 47 will be raised to a position above the lower leading ends 51 of the cams 48 so that they will engage the cam and travel upwardly thereover, as indicated by the dotted lines in Figure 5. As the guide rollers 47 thus travel upwardly over the cams 48, the carriers or holders 37 will be elevated to a position to engage the shaft ends 27 of the loom 26, thereby causing the loom to be automatically picked up by the carriers, after which the latter will be lowered to their normal suspended position, as shown at the right hand side of Figure 5. When the holders have thus been loaded and are returned to their normal suspended positions beneath the tracks 11, the guide rollers 47 will be moved downwardly against the tension of the springs 46, until the lower ends of the sleeves 38 engage the horizontal portions 41 of the arms 36. When thus positioned, it will be noted by reference to Figure 3, that the guide rollers 47 will be positioned at a level beneath the lower ends of the cams 48 so that they will pass therebeneath without engaging them, thus causing the load to continue onward over the conveyer system uninterruptedly until it reaches the place where it is unloaded. It will be noted, therefore, that when the holders are loaded, they will pass beneath the cams 48, but when empty, the guide rollers 47 will be positioned to engage the leading ends 51 of the cams, and the holders will then be elevated to the full line position shown in Figure 5, after which they will again be lowered to their normal suspended positions beneath the rails 11.

The means provided for unloading the loom beams from the carriers or holders 37 is shown at the right hand side of Figure 1 and consists of a pair of inclined beams 52 arranged at a convenient height above the floor 53 upon a suitable frame 54. One end of each beam 52 extends into the path of the shaft ends 27 of the loom beam, so that when the latter is lowered from its normal carrying level, the shaft ends thereof will engage the end portions 55 of the beams 52, which will thereby effect their release from the holders 37. The loom beams will then roll to the dotted line position shown in Figure 1 into engagement with a pair of upturned stop members 56 terminally secured to the beams 52. The guide rollers 47 of the empty holders 37 will thereafter engage the guide rails or tracks 57, extending upwardly and over the upper tracks 15. These guide rails provide a support for the swinging ends of the arm 36, when the empty holders are traveling from the unloading station formed by the beams 52, and over the tracks 15 and downwardly therefrom, as shown at the left hand side of Figure 1, to their normal suspended positions, also shown in this figure. The opposite ends of the guide rails 57 are curved as shown at the left hand side of Figure 1 to suitably guide the holders 37 to their normal suspended positions.

In the drawings, I have shown but two loading stations and one unloading station, but it is to be understood that any number of such stations may be employed and also that the type of carriers or holders used may be varied in numerous ways without departing from the scope of the invention.

I claim as my invention:

1. An apparatus of the class described comprising a conveyer belt, a member pivotally connected with said belt and normally depending therefrom, a work holder movably associated with said member, a guide roller on the holder, means adapted to be engaged by said roller to lift the work holder with respect to the conveyer belt, and said work holder being adapted to move downwardly when loaded, whereby said roller will be moved out of the path of said lifting means to permit the work holder to pass therebeneath.

2. An apparatus of the class described, comprising a conveyer belt, a member pivotally connected at one end with said belt and normally depending therefrom, a work holder yieldably connected with said member, a guide roller on the holder, cam elements adapted to be engaged by said roller to lift the work holder with respect to the conveyer belt, and said work holder being translatable downwardly upon said member, when loaded, whereby said roller will pass beneath said cam elements without engaging therewith.

3. An apparatus of the class described, comprising an elevated conveyer belt, an arm pivotally connected with the belt and normally depending therefrom, an article-carrier or holder slidably connected with said arm and having means yieldably holding it in a raised position relative thereto, a cam arranged beneath the conveyer belt, and means on said holder adapted to engage said cam when the holder is empty, to cause the holder to be raised or lifted to an elevated position.

4. An apparatus of the class described, comprising an elevated conveyer belt, an arm pivotally connected with the belt and normally depending therefrom, an article-carrier or holder slidably connected with said arm, yieldable means normally holding said holder in a raised position relative to the arm, a cam arranged beneath the conveyer belt, and an anti-friction roller on said holder adapted to engage said cam, when the holder is empty, and said holder further being adapted to pass beneath said cam without engaging it, when the holder is carrying a load.

5. An apparatus of the class described, comprising a track, an endless belt supported thereby, an arm pivotally connected with the belt and normally depending therefrom, an article-carrier or holder slidably connected with said arm and having spring elements holding it in raised position, a plurality of cams arranged beneath said track, and means on said holder adapted to engage said cams to lift the holder to a higher level, when the holder is empty, and when said holder is loaded, said means will be moved downwardly upon said arm to permit said means to pass beneath said cams.

6. An apparatus of the class described comprising a track, an endless belt supported thereby, arms pivotally connected with the belt and normally depending therefrom, an article-carrier or holder slidably connected with each arm, spring elements connected with said arms and holders and normally holding the latter in raised positions upon said arms, a cam arranged beneath the track, a load-supporting member between the track and said cam, a guide roller on each holder adapted to engage said cam and move the empty holder upwardly to permit the latter to pick up a load from said load-supporting member, without interrupting the movement of the holder.

7. In an apparatus of the class described, horizontally spaced rails, conveyer belts mounted to travel thereon, a plurality of arms pivotally connected with the conveyer belts and normally depending therefrom, an article-carrier or holder slidably and yieldably connected with each arm, a plurality of cams arranged beneath said tracks and positioned to be engaged by said holders, stationary means at the upper portions of said cams adapted to support a load having portions positioned to be engaged by a pair of said holders, when the latter are elevated by said cams, and whereby the holders will automatically engage and pick up the load, after which the loaded holders will return to suspended positions beneath said conveyer belts.

8. An apparatus of the class described comprising a pair of horizontally spaced rails, conveyer belts mounted to travel thereon, a plurality of arms pivotally connected with each conveyer belt and the arms of one belt cooperating with the arms of the other belt to form pairs of arms, all of which normally depend from the conveyer belts, an article-carrier or holder connected with each arm, a guide roller connected with each holder, a plurality of cams arranged beneath said tracks and positioned to be engaged by said guide rollers, stationary article-supporting members also arranged beneath said rails and adapted to support an article having its end portions extending into the path of said holders, when the latter are elevated by the action of said rollers engaging said cams, and whereby said holders will automatically pick up the article positioned upon said members and lower it to a suspended position beneath the conveyer belts, and means for automatically unloading the article from said holders without interrupting the travel of the latter.

9. An apparatus of the class described, comprising a pair of horizontally spaced rails, conveyer belts mounted to travel thereon, a plurality of arms pivotally connected with each conveyer belt and the arms of one belt cooperating with the arms of the other belt to form pairs of arms, all of which normally depend from the conveyer belts, an article-carrier or holder connected with each arm, a guide roller connected with each holder, a plurality of cams arranged beneath said tracks and positioned to be engaged by said guide rollers, when the holders are empty, stationary article-supporting members also arranged beneath said rails and adapted to support an article having its end portions extending into the path of said holders when the latter are elevated by said rollers engaging said cams, and whereby said holders will automatically pick up the article positioned upon said members and lower it to a suspended position beneath the conveyer belts, and means for automatically unloading the article from said holders without interrupting the travel of the latter, said means comprising a pair of beams positioned to engage and receive the article, during its travel, and to permit the empty holders to continue their travel.

10. An apparatus of the class described, comprising a suitable track, article carriers suspended therefrom and having means for engaging and supporting the articles to be conveyed, a device for moving the article carriers from an idle to a loading position, and said article engaging and carrying means being adapted to be moved, by the weight of the article thereon to a point where its carrier will pass clear of said device.

11. An apparatus of the class described, comprising a suitable track, a loading station arranged in proximity thereto, extensible carriers adapted to travel on said track and having means for automatically picking up at said station, an article to be conveyed, and means for automatically directing the moving carriers, when unloaded, to said loading station to pick up an article.

12. An apparatus of the class described, comprising a suitable track, means adjacent to said track adapted to support an article, a carrier adapted to travel on said track and provided with means for causing each unloaded carrier to pick up an article from one of said supporting means, and said carriers being adapted, when loaded, to pass clear of said supporting means.

13. An apparatus of the class described, comprising a suitable track, a series of loading stations arranged in proximity thereto, carriers movable on said track and depending therefrom, and means for causing all unloaded carriers to be elevated, as they pass said stations, and pick up a load positioned at one of the stations and, when loaded, to pass beneath said stations.

14. An apparatus of the class described, including a conveyer, a plurality of loading stations adjacent said conveyer, carriers connected to said conveyer and movable therewith past said loading stations, means for elevating said carriers with respect to said conveyer, and means operated by a load upon said carriers for rendering said elevating means inoperative.

In witness whereof, I have hereunto set my hand this 5th day of April, 1927.

MARTIN J. ANDERSON.